United States Patent

[11] 3,613,808

[72] Inventor Philip R. Bunnelle
 Santa Clara, Calif.
[21] Appl. No. 784,774
[22] Filed Dec. 18, 1968
[45] Patented Oct. 19, 1971
[73] Assignee FMC Corporation
 San Jose, Calif.

[54] ARTICLE-SORTING APPARATUS WITH TRANSFER-ERROR-REDUCING ARRANGEMENT
 3 Claims, 9 Drawing Figs.
[52] U.S. Cl. .................................................. 177/53,
 177/157, 209/121
[51] Int. Cl. ....................................................... G01g 13/00
[50] Field of Search............................................ 177/16, 50,
 52–57, 154–157; 209/121

[56] References Cited
 UNITED STATES PATENTS
 2,597,069 5/1952 Conti............................ 177/154
 2,889,031 6/1959 Hopkins et al................ 177/52 X
 3,006,469 10/1961 Craig............................ 177/52 X
 3,065,809 11/1962 Brown........................... 177/156
 3,095,055 6/1963 McLauchlan ................. 177/53
 3,152,655 10/1964 Allan et al. ................... 177/52
 3,434,595 3/1969 Seaborn et al................ 177/52 X Primary Examiner—Richard B. Wilkinson
Assistant Examiner—George H. Miller, Jr.
Attorneys—F. W. Anderson and C. E. Tripp ABSTRACT: An arrangement for reducing weighting inaccuracies in article-sorting apparatus caused by the advancement of continuously moving articles to be weighed onto the weighing platform of a check weighing apparatus. The arrangement employs suitable lockup means, such as a fluid-activated device, that holds or locks the weighing platform in the raised position until the error-producing activity of the continuously moving article advancing onto the weighing platform has subsided. The lockup means releases the weighing platform during the weighing operation so that the platform is freely deflectable during the weighing operation.

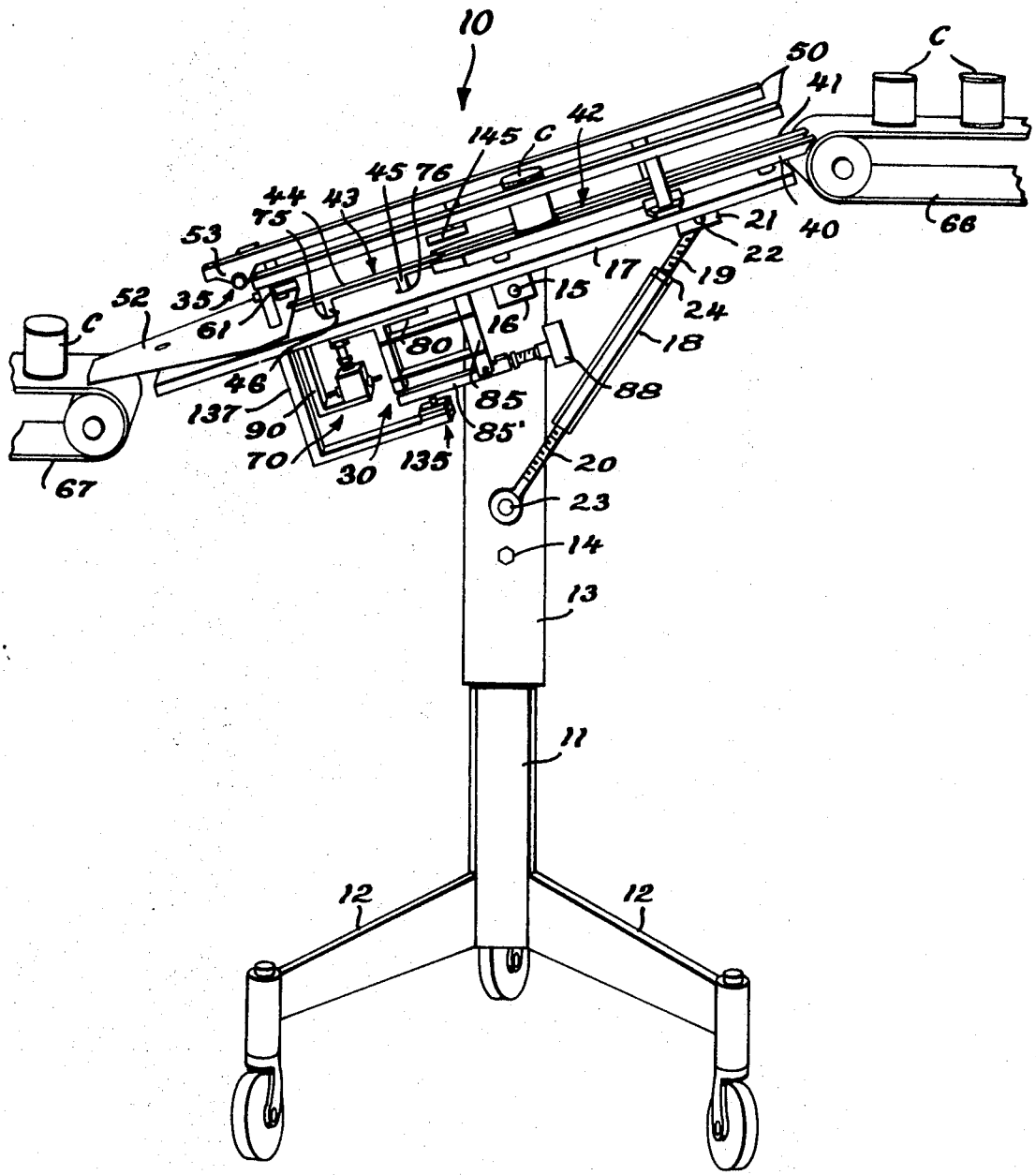

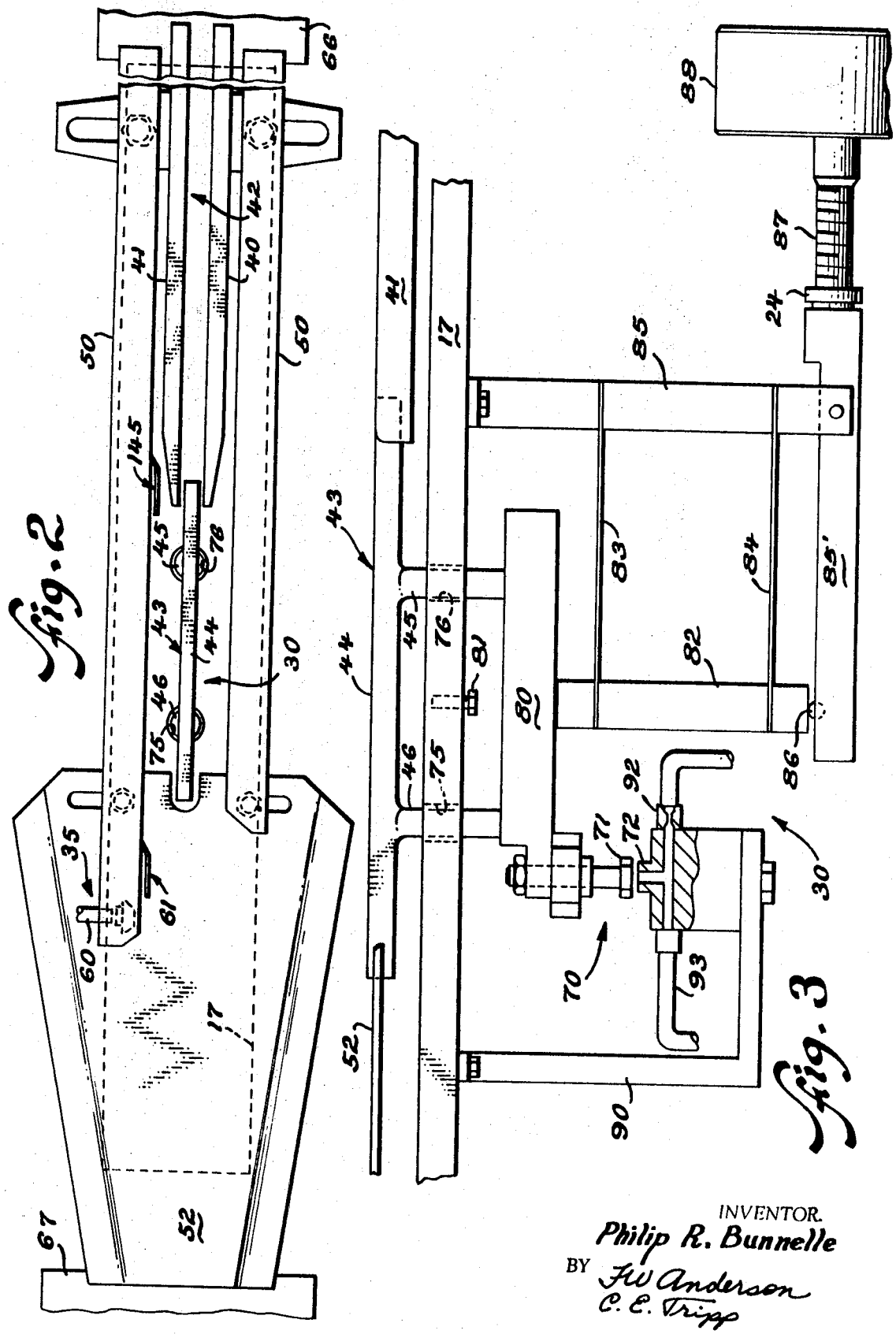

INVENTOR.
Philip R. Bunnelle
BY J.W. Anderson
C.E. Tripp

ATTORNEYS

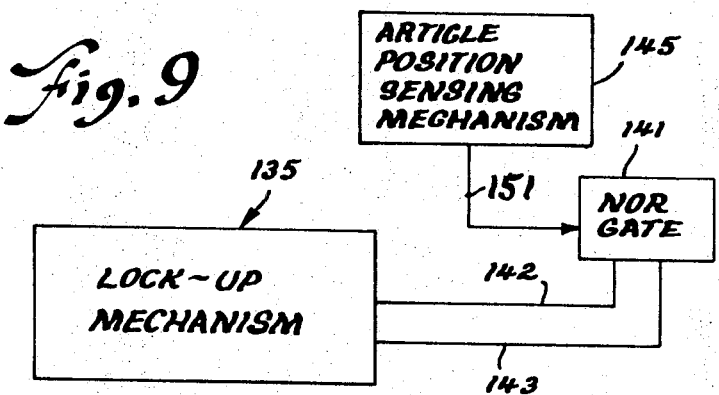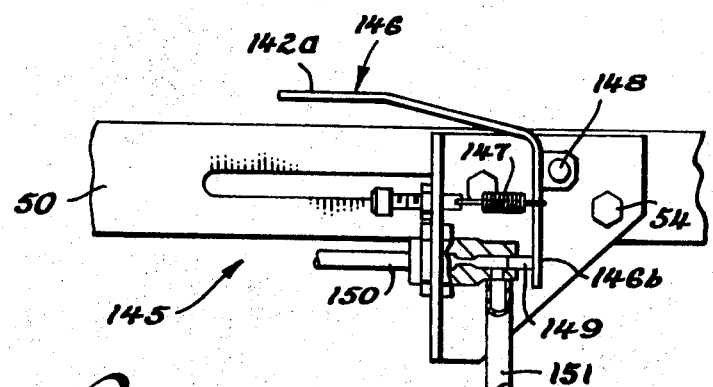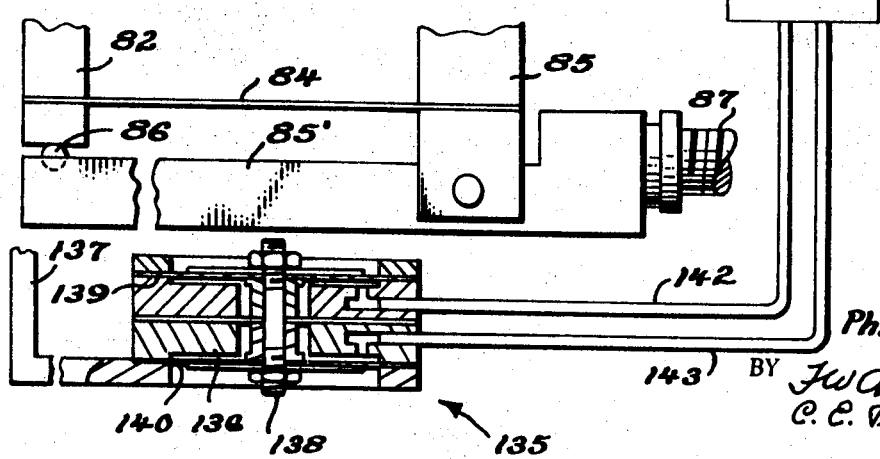

ARTICLE-SORTING APPARATUS WITH TRANSFER-ERROR-REDUCING ARRANGEMENT

BACKGROUND OF THE INVENTION

The present invention relates in general to apparatus for sorting articles, and more particularly to apparatus for sorting a succession of continuously advancing articles in accordance with the weight thereof.

The sorting apparatus of the present invention employs a weighing apparatus, commonly referred to as a check weigher, which receives a succession of continuously advancing articles, measures the weight thereof and advances them in succession to a segregating assembly. The segregating assembly is remotely controlled in accordance with the weight of a weighed article, and it either accepts or rejects the weighed article, dependent upon its weight relative to a prescribed standard.

A principle source of error in the weighing of continuously advancing articles by high-speed check-weighing apparatus is introduced when an article is advanced onto the weighing platform of the high-speed check-weighing apparatus. This error is referred to herein as the transfer error. Transfer error can be accentuated by misalignment of the weighing platform and article configuration. It appears that transfer errors can be reduced by precise alignment of the weighing platform. It is not practical to alter package configuration. It is desirable in the operation of a check weighing apparatus to obviate the need of precise weighing platform alignment in order to reduce the transfer error.

SUMMARY OF THE INVENTION

It is an object of the present invention to reduce weighing inaccuracies in check weighing apparatus by minimizing the effect of transfer error.

Another object of the present invention is to reduce transfer errors in check weighing apparatus without resorting to precise weighing platform alignment.

According to the present invention, lockup means are employed to restrain the weighing platform of a check weighing apparatus against deflection while an article is advancing onto the weighing platform and to release the weighing platform to permit free deflection thereof during the weighing operation of the article advancing on the weighing platform.

BRIEF DESCRIPTION OF THE DRAWINGS

FIG. 1 is a side elevational view of the article-sorting apparatus embodying the present invention.

FIG. 2 is a plan view of the article-sorting apparatus illustrated in FIG. 1.

FIG. 3 is a fragmentary schematic elevational view of a check weighing apparatus of the article-sorting apparatus shown in FIGS. 1 and 2, and particularly illustrating a weight-sensing device therefor.

FIG. 7 is a schematic elevation view of a lockup mechanism for the weight-checking apparatus.

FIG. 8 is a schematic plan view of an article-position-sensing mechanism for the article-sorting apparatus.

FIG. 9 is a schematic diagram of a fluid control circuit for controlling the operation of the lockup mechanism in response to the operation of the transfer-article-position-sensing mechanism.

DESCRIPTION OF THE PREFERRED EMBODIMENT

Figure 4:
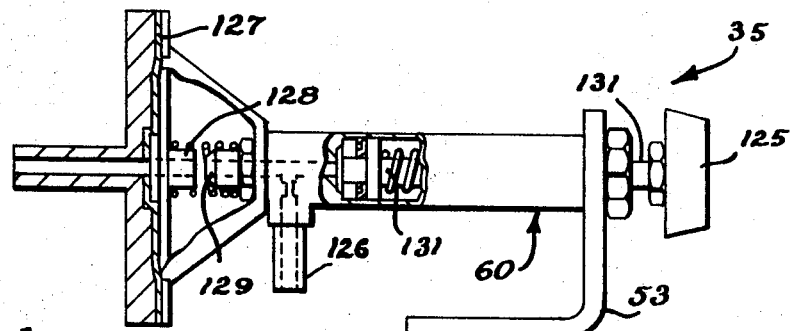
FIG. 4 is a schematic elevational view of a reject mechanism used in the article-sorting apparatus.

Illustrated in FIGS. 1 and 2 is the article sorting apparatus 10 embodying the present invention, which apparatus includes an upright post 11. From the upright post 11, extends support members 12. At the distal end of each support member 12 is a ground-engaging element. Surrounding the post 11 is a sleeve 13, which is vertically adjustable on the post 11 and can be clamped at an adjusted height by suitable bolts 14.

At the upper extremity of the sleeve 13 is a suitable rod 15 about which a baseplate 17 is pivotal through depending ears 16. For adjustably positioning the baseplate 17 at selected angles of inclination from the horizontal, an internally threaded sleeve 18 receives in threaded engagement an upper threaded eyebolt 19 and a lower threaded eyebolt 20. The eye of the bolt 19 is attached to ears 21 of the baseplate 17 through a pivot bolt 22 and the eye of the bolt 20 is mounted on the sleeve 13 through a pivot bolt 23. The threads of the bolts 19 and 20 are of opposite hand and the sleeve 18 is threaded upon the eyebolts and clamped in adjusted position by a locknut 24. Through this arrangement, rotation of the sleeve 18 serves to adjustably position the baseplate 17 at selected angles of inclination from the horizontal.

Mounted on the baseplate 17 is a weight-checking apparatus 30 and a reject mechanism 35. By adjusting the angle of inclination of the baseplate 17 from the horizontal, the angle of inclination from the horizontal of article-transporting surfaces of the weight-checking apparatus 30 and the reject mechanism 35 are similarly adjusted. Generally, the minimum angle of inclination from the horizontal is 10° and the maximum angle of inclination from the horizontal is 30°. In the exemplary embodiment, the angle of inclination is 15° from the horizontal.

The article-sorting apparatus 10 includes laterally spaced rails 40 and 41 which define at the upper surfaces thereof an approach platform 42. The rails 40 and 41 are fixed to the baseplate 17. Adjacent to the approach platform 42 is a weighing platform 43 for the check weighing apparatus 30 which has its upper surface normally, or when undeflected, in planar relation with the approach platform 42 at the downstream side thereof. The weighing platform 43 is in the form of a single runner 44 with legs 45 and 46 spaced in the direction of travel of an article to be weighed. The weighing platform 43 is deflectable relative to the baseplate 17. Guide rails 50 are fixed to the baseplate 17 through suitable posts on each side of the approach platform 42 and the weighing platform 43 to guide articles advancing therealong.

Figure 5:
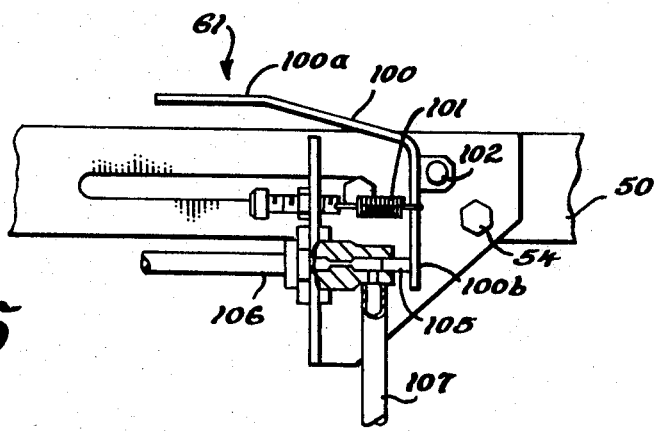
FIG. 5 is a schematic plan view of a reject-package-position-sensing mechanism for the article-sorting apparatus.

The reject mechanism 35 is adjacent a discharge platform 52, the upper surface of which is always slightly below the upper surface of the weighing platform 43. The reject mechanism 35 is mounted on the rails 50 by means of brackets 53. An air cylinder 60 (FIG. 4) is mounted on the bracket 53 for rejecting an article advancing across the discharge platform 52. A suitable reject-article-position-sensing mechanism 61 (FIGS. 1, 2 and 5) is bolted to the rails 50 to sense the advancement of a weighed article on the discharge platform 52. When a weighed article is to be rejected, the article-position-sensing mechanism 61 completes a fluid control circuit 65 (FIG. 6) to operate the air cylinder 60 to deflect an article to be rejected advancing on the discharge platform 52. While reference is made to an air cylinder 60, other reject mechanisms may be employed, such as fluidically controlled high-pressure air jets, to blow a rejected article to a reject conveyor or line. Although reference is made to the reject-article-position-sensing mechanism 61, other forms of article-sensing devices may be employed, such as a timing cam synchronized with the operation cycle, an interruptable jet of air or a back pressure nozzle blocked by the advancement of an article and the like.

Articles are advanced to the approach platform 42 by a feed conveyor 66 (FIG. 1). Acceptable articles are advanced from the discharge platform 52 onto a discharge conveyor 67, or by a chute or bin. There may also be a discharge conveyor, chute or bin for receiving rejected articles. Articles advance from the feed conveyor 66 across the approach platform 42, the weighing platform 43 and the discharge platform 52 to the discharge conveyor under the force of gravity.

As articles, such as cans C advance continuously and successively over the scale platform 43, they are weighed individually by deflecting the scale platform 43. As each article deflects the scale platform 43, respectively, a weight-sensing device 70, such as a flapper valve arrangement detects the deflection of the scale platform 43. As the scale platform 43 is deflected by the weight of an article advancing thereover, a flapper 71 (FIG. 3) attached to the scale platform 43 reduces the open area around a nozzle 72 causing pressure in the nozzle throat to be built up. Unacceptable articles cause the weight-sensing device to produce a reduced pressure fluid signal to effect or permit reject operation and acceptable articles cause the weight-sensing device to produce an increased pressure fluid signal to prevent a reject operation. The reduced pressure signal enables the fluid control circuit 65 (FIG. 6) to generate a reject fluid signal for operating the reject mechanism 35. The reject mechanism 35 is operated by the fluid control circuit 65 when the weight-sensing device 70 enables the fluid control circuit 65 to generate a reject fluid signal and when the article-reject-position-sensing mechanism 61 has been activated.

The check-weighing apparatus 30 includes the scale platform 43 that has the runner 44 thereof substantially aligned with the approach platform 42 and substantially aligned with the discharge platform 52. Depending from the runner 44 are the legs 45 and 46 that are spaced apart in the direction of travel of articles advancing across the runner 44. Formed in the baseplate 17 are suitable openings 75 and 76, which receive the legs 45 and 46, respectively. The legs 45 and 46 are freely movable within the openings 75 and 76, respectively, and project through the base platform 17.

Joining the ends of the legs 45 and 46 projecting below the base plate 17 is a base member 80 (FIG. 3). The base member 80 is disposed in parallel relation to the runner 44 and, of course, the legs 45 and 46 are disposed in parallel relation to each other. A stop 81 in the form of a bolt is threaded to the baseplate 17 with the head of the bolt 81 extending therebelow. The head of the bolt 81 is engageable by the base member 80 to limit the upward movement of the runner 44.

Secured to the base member 80 in depending relation thereto midway between the legs 45 and 46 and below the stop 81 is a movable column 82. Supporting the movable column 82 are parallel, vertically spaced cantilever leaf springs 83 and 84. The opposite ends of the leaf springs 83 and 84 are mounted on a stationary column 85, which is fixedly secured to the baseplate 17.

Thus, an article advancing across the scale platform 43 applies a downward force on the runner 44 which is transmitted through the legs 45 and 46. This action applies a downward force onto the base member 80 which is transmitted to the movable column 82 to cause a deflection of the runner 44, the legs 45 and 46, the base member 80 and the column 82 against the urgency of the leaf springs 83 and 84.

For preloading the movable members just described, a preload arm 85' (FIGS. 3 and 7) with a contact surface 86 applies a preload force to the lower end of the movable column 82. Intermediate its ends, the preload arm 85' is supported by the stationary column for pivotal movement. Carried by the preload arm 85' is a threaded shaft 87 on which is carried a preload weight 88 with internal threads. The weight 88 is adjustably positioned along the threaded shaft 87 for regulating the preload force applied to the movable column 82. A spring may be employed equally as well for preloading the weighing platform 43.

Thus, the base member 80 for the scale platform 43 is mounted for free motion in a direction perpendicular to the baseplate 17 and, yet, is restrained against movement in the plane of motion of articles advancing across the runner 44. The weighing platform 43 is restrained against motion in the direction of travel of the articles by the upper and lower cantilever springs 83 and 84. The base member 80 of the weighing platform 43 is supported by the downstream ends of the cantilever springs 83 and 84 to restrain the weighing platform 43 against all motion other than the downwardly deflecting weighing motion. The preload force applied through the preload arm 85' urges the base member 80 into engagement with the stop member 81. The preload assembly is adjustable through the weight 88 to select the degree of preload imparted to the weighing platform 43.

For sensing the weighing deflection of the weighing platform 43, the weight-sensing device 70, such as the flapper valve arrangement, is provided, which includes the flapper 71 (FIG. 3) mounted on the base member 80 for movement therewith. Mounted on the baseplate 17 by way of a bracket 90 is the nozzle 72 that is spaced from the flapper 71. A conduit 92 supplies air under pressure to the nozzle 72 through an orifice and a conduit 93 withdraws air under pressure from the nozzle 72. As the weighing platform 43 deflects under the weight of an article advancing thereacross, the flapper 71 reduces the open area around the nozzle 72 commensurate with the deflection of the weighing platform 43. This action causes pressure in the nozzle throat to build up and to increase commensurate with the magnitude of deflection of the weighing platform 43.

Spaced downstream from the weighing platform 43 is the reject-article-position-sensing mechanism 61, (FIG. 5) which is fixed to the rails 50. The article-position-sensing device 61 includes a pivot arm 100 that has its trip end 100a disposed in the path of travel of an article advancing from the weighing platform 43 onto the discharge platform 52. The arm 100 is spring loaded by a return spring 101 to return the arm 100 to its initial position after the article deflecting the same advances therebeyond. A bracket 102 mounted on one of the rails 50 by the bolts 54 retain the arm 100 for pivotal movement.

Figure 6:
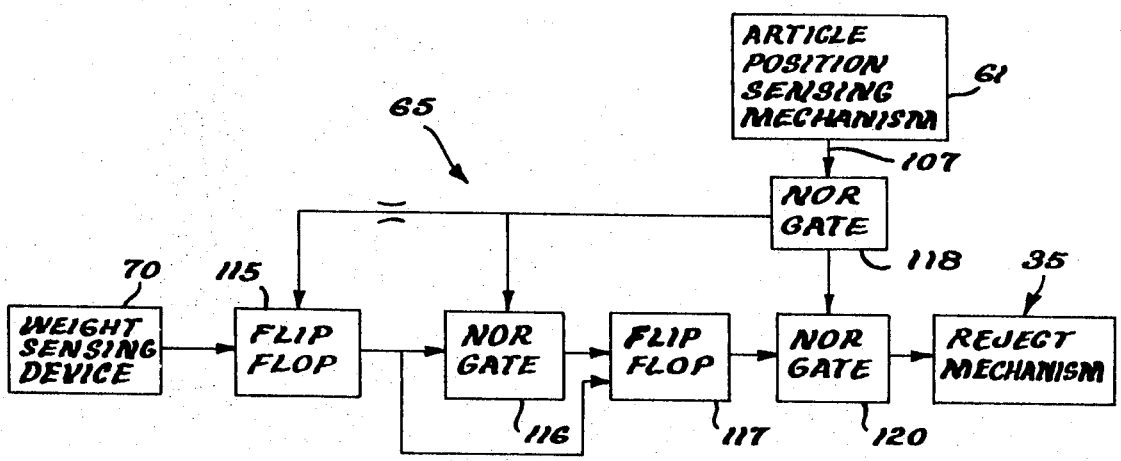
FIG. 6 is a schematic diagram of a fluid control circuit for controlling the operation of the reject mechanism in response to the operation of the weight-sensing device and the package-position-sensing mechanism.

A flapper nozzle 105 is supported adjacent a flapper end 100b of the arm 100. Air under pressure is supplied to the nozzle 105 through a conduit 106 and at an orifice at the output end thereof. Air under pressure is discharged from the nozzle 105 through a conduit 107. After an article advances beyond the weighing platform 43 onto the discharge platform 52, it deflects the trip arm 100 which causes the activation of the reject-article-position-sensing mechanism 61 to cause a pressure drop in the nozzle 105 and conduit 107 and this loss of pressure serves as a fluid signal through the conduit 107 for transmission to the fluid control circuit 65 (FIG. 6).

As the trip arm 100 is deflected by an advancing article, the flapper end 100b of the trip arm 100 increases the open area around the nozzle 105, causing reduced pressure in the nozzle throat. This reduced pressure in the nozzle throat 105 permits a reduced pressure signal to be transmitted through the conduit 107 to the fluid control circuit 65. After the article advances beyond the trip arm 100, the trip arm 100 returns to its initial position under the urgency of the spring 101.

The fluid control circuit 65 (FIG. 6) includes a conventional fluidic flip-flop 115, which has one input connected to the output of the fluid weight-sensing device 70 and a reset input connected to a conventional fluidic NOR-gate 118. The fluidic NOR-gate 118 is connected to the article-position-sensing mechanism 61.

Should the weight-sensing device 70 generate a fluid pressure signal in excess of a preselected magnitude, which corresponds to an acceptable article weight, the state of the fluidic flip-flop 115 is changed. The fluidic flip-flop 115 remains in the changed state until reset by the fluidic NOR-gate 118. In case the weight-sensing device 70 generates a fluid signal not in excess of the preselected magnitude, which corresponds to a reject article weight, the state of the flip-flop 115 is not changed. Thus, the output of the flip-flop 115, unless changed by the weight-sensing device 70, will produce in its output a fluid signal corresponding to a reject signal.

A conventional fluidic NOR-gate 116 is connected to the output of the flip-flop 115 and a conventional fluidic flip-flop 117 is connected to the output of the flip-flop 115 and the NOR-gate 116. When the fluidic flip-flop 115 changes its mode of operation, the flip-flop 117 changes its state and the NOR-gate 116 produces an output signal to maintain the flip-flop 117 in its change of state.

A conventional fluidic NOR-gate 120 is connected to the output of the fluidic NOR-gate 118 and the fluidic flip-flop 117. The NOR-gate 120 is in a state to operate the reject mechanism 35, unless inhibited. While the flip-flop 117 is in its initial or normal state, the NOR-gate 120 is not inhibited. During the time the flip-flop 117 has changed its state, which is changed by the change of state of the flip-flop 115, the NOR-gate 120 is inhibited.

When the article-position-sensing mechanism 61 is not activated by an advancing article, the NOR-gate 118 generates an output fluid signal to the NOR-gate 120 to inhibit it from producing an output signal. After a weighed article advances beyond the weighing platform 43, the article-position-sensing mechanism 61 is activated to cause the NOR-gate 118 not to transmit an output signal to the NOR-gate 120, whereby the NOR-gate 120 is no longer inhibited from producing an output signal. During the time the NOR-gate 120 produces an output signal, the reject mechanism 35 is operated.

The flip-flops 115 and 117, and the NOR-gates 116, 118, and 120 are conventional fluidic devices, and are of the type manufactured by Corning Glass Works and are known as Corning fluidic devices.

In the event an acceptable weight article advances across the weighing platform 43, the flip-flop 115 through the action of the weight-sensing device 70 changes its state, which causes the flip-flop 117 to change its state and causes the NOR-gate 116 to operate for maintaining the flip-flop 117 in its change of state. The changing of the state of the flip-flop 117 inhibits the NOR-gate 120 from producing an output signal. Hence, the reject mechanism 35 is not operated.

As the acceptable weight article activates the article-position-sensing mechanism 61, the NOR-gate 118 is operated thereby to remove its inhibiting output from the NOR-gate 120. However, the NOR-gate 120 is presently inhibited by the flip-flop 117 from producing an output signal. Thus, the reject mechanism 35 is not operated. The NOR-gate 118 at this time transfers its output signal to transmit a reset fluid signal to the flip-flop 115 and to transmit an input signal to the NOR-gate 116. As the article-position-sensing mechanism 61 returns to its initial position after the acceptable weight article advanced therebeyond, the NOR-gate 118 removes the reset fluid signal from the flip-flop 115 and removes the fluid signal from the NOR-gate 116, and transmits an inhibiting signal to the NOR-gate 120 to prevent spurious reject operation. By removing the override signal from the NOR-gate 116, the flip-flop 115 returns the flip-flop 117 to its initial state.

If the weight-sensing device 70 does not transmit a fluid signal of sufficient magnitude, which represents a reject signal, then the flip-flop 115 does not change its state and the flip-flop 117 does not change its state. Hence, the flip-flop 117 does not inhibit the NOR-gate 120 from operating the reject mechanism 35. When the article position-sensing-mechanism 61 is activated by an article advancing from the weighing platform 43, the NOR-gate 118 removes its input signal to the NOR-gate 120. The NOR-gate 120 is no longer inhibited by the NOR-gate 118 and is not inhibited by the flip-flop 117. Therefore, the NOR-gate 120 through its output fluid signal operates the reject mechanism 35.

After the reject weighed article advances beyond the article-position-sensing mechanism 61, the article-position-sensing mechanism 61 returns to its initial position and the NOR-gate 118 again transfers its fluid output to once again inhibit the NOR-gate 120. As a consequence thereof, the NOR-gate 120 does not generate an output signal to operate the reject mechanism 35.

The reject mechanism 35 (FIG. 4) has its air cylinder 60 mounted on the bracket 53 and includes a plunger 125 for deflecting a weighed article to be rejected into a path for rejected articles. Air under pressure is supplied to the air Cylinder 60 through a conduit 126 with a discharge orifice. The pressure of the air advancing through the outlet orifice of the conduit 126 is insufficient to cause a reject operation while the flapper is in its retracted position.

When the NOR-gate 120 generates an output signal, the reject mechanism 35 is activated by causing the activation of a diaphragm 127 of the air cylinder 60, which operates a flapper valve 128 for restricting the flow of air in a nozzle 129. This action causes pressure to build up in an air cylinder 60, by virtue of an increased pressure advancing beyond the outlet orifice of the conduit 126, which extends a piston 131 to cause the piston plunger 125 to deflect an oncoming article. The piston 131 is spring loaded to return to its retracted position after the NOR-gate 120 is turned off.

According to the present invention, a lockup mechanism 135 (FIG. 7) is provided to restrain the weighing platform 43 against deflection during the time an article is transferred from the approach platform 42 onto the weighing platform 43 to reduce transfer error. Toward this end, the lockup mechanism 135 comprises a double diaphragm device 136 which is mounted on the baseplate 17 by means of a bracket 137. The double diaphragm device 136 includes a shuttle 138 movable in a direction toward or away from the preload arm 85' under the control of diaphragms 139 and 140.

Communicating with the diaphragms 139 and 140 is a conventional fluidic NOR-gate 141 of the type previously mentioned as Corning fluidic devices manufactured by Corning Glass Works through conduits 142 and 143. When the article-position-sensing mechanism 145 is activated, the NOR-gate 141 generates an output signal through the conduit 142, whereby the diaphragm 139 is actuated to move the shuttle 138 into engagement with the preload arm 85' to maintain the preload arm 85' in position and thereby maintain the weighing platform 43 in engagement with the stop 81 (FIG. 3). As a consequence thereof, the weighing platform 43 is locked up or restrained from deflection.

After the article advances beyond the article-position-sensing mechanism 145 and the article-position-sensing mechanism 145 returns to its initial condition, the NOR-gate 141 generates an output signal, which is conducted through the conduit 143, whereby the diaphragm 140 is actuated to move the shuttle 138 away from the preload arm 85' to release the preload arm 85'. As a consequence thereof, the weighing platform 43 is no longer restrained and is free to deflect unimpeded by the lockup mechanism 135. It is apparent that the mechanism 135 may be spring loaded for moving the shuttle 138 away from the preload arm 85'.

The weighing platform 43 is restrained by the lockup mechanism 135 against deflection while an article is advancing onto the weighing platform 43 and is released to permit free deflection thereof during the weighing operation of the article on the weighing platform 43. For this purpose, the article-position-sensing mechanism 145 (FIG. 8) is mounted on the rails 50 with a pivot arm 146 that has its trip end 146a disposed in the path of travel on an article advancing onto the weighing platform 43 from the approach platform 42. The arm 146 is spring loaded by a return spring 147 to return the arm 146 to its initial position after the article deflecting the same has advanced onto the weighing platform 43. A bracket 148 mounted on the rails 50 by bolts retain the arm 146 for pivotal movement.

A flapper nozzle 149 is supported adjacent a flapper end 146b of the arm 146. Air under pressure is supplied to the nozzle 149 through a conduit 150. Air under pressure is discharged from the nozzle 149 through a conduit 151. After an article advances onto the weighing platform 43, it deflects the trip arm 146 which causes the activation of the article-position-sensing mechanism 145 to cause a pressure drop in the nozzle 149 and conduit 151 and this pressure serves as a fluid signal through the conduit 151 for transmission to the NOR-gate 141. As the trip arm 146 is deflected by an advancing article, the flapper end 146b of the trip arm 146 increases the open area around nozzle 149, causing pressure in the nozzle throat to drop. This drop in pressure is transmitted through the conduit 151 to the fluidic NOR-gate 141. After the article advances beyond the trip arm 146 and onto the weighing platform 43, the arm 146 returns to its initial position under the urgency of the spring 147.

As an article is transferred from the approach platform 42 onto the weighing platform 43, it deflects the trip arm 146, which causes the article-position-sensing mechanism 145 to generate a fluid signal through the conduit 151 for transmission to the NOR-gate 141 to generate a signal for transmission through the conduit 142. When air under pressure is conducted through the conduit 142, the diaphragm 139 is actuated to cause the shuttle 138 to engage the preload arm 85', thereby locking the weighing platform 43 against the stop 81.

After the article has advanced onto the weighing platform 43, the article advances beyond the trip arm 146 and the trip arm 146 returns to its initial position under the urgency of the spring 147. When this occurs, the article-position-sensing mechanism 145 changes its output signal to cause the NOR-gate 141 to conduct air under pressure through the conduit 143 to cause the diaphragm 140 to move the shuttle 138 away from the preload arm 85'. Now, the weighing platform 43 is free to deflect under the weight of the article advancing on the weighing platform 43 unimpeded by the lockup mechanism 135.

In the operation of the article-sorting-apparatus 10, articles are advanced continuously and successively by the feed conveyor 66 onto the approach platform 42. As an article is advanced from the approach platform 42 onto the weighing platform 43, the article-position-sensing mechanism 145 is actuated, which changes the output signal of the NOR-gate 141. As a consequence thereof, air under pressure is conducted through the conduit 142 to activate the diaphragm 139. Thereupon, the shuttle 138 engages the preload arm 85', thereby maintaining the weighing platform 43 against the stop 81. The weighing platform is now locked up and restrained against deflection.

As the article advances onto the weighing platform 43 from the approach platform 42 and advances beyond the article-position-sensing mechanism 145, the article-position-sensing mechanism 145 is returned to its initial state under the urgency of the spring 147. When this occurs, the NOR-gate 141 generates its initial output signal. Now, air under pressure is conducted through the conduit 143 to activate the diaphragm 140. The shuttle 138 is retracted from the preload arm 85' and the weighing platform 43 is no longer restrained by the lockup mechanism 135. Thus, the weighing platform 43 deflects freely unrestrained by the lockup mechanism 135 after an article is transferred thereon.

The article on the weighing platform 43 advances thereacross under the force of gravity. As an article advances across the weighing platform 43, the weighing platform 43 deflects. The magnitude of deflection is sensed by the weight-sensing device 70, which transmits a fluid signal commensurate with the magnitude of deflection. When an article advancing over the weighing platform 43 is underweight, the output signal of the weight-sensing device 70 is insufficient to change the state of the flip-flop circuit 115. It is apparent that the weight-sensing device 70 could be set to detect overweight articles for rejection. Under these circumstances, the weight-sensing device 70 determines whether the deflection of the weighing platform 43 exceeds a predetermined magnitude and when it does the output signal from the weight-sensing device 70 does not change the state of the flip-flop 115. It is also apparent that more than one weight-sensing device 70 could be employed so as to reject either an overweight article or an underweight article.

When the flip-flop 115 does not change its state, the flip-flop 117 does not change its state. Therefore, the NOR-gate 120 is not inhibited by the flip-flop 117.

After the underweight weighed article advances from the weighing platform 43 onto the discharge platform 52, it engages the article-position-sensing mechanism 61 to activate the same. The activation of the article-position-sensing mechanism 61 causes the NOR-gate 118 to remove its inhibiting output signal from the NOR-gate 120. When the NOR-gate circuit is not inhibited by the flip-flop 117 or the NOR-gate 118, the NOR-gate circuit 120 produces an output signal to operate the reject mechanism 35 to deflect the weighed article into the path for reject articles.

When the weighed article advances beyond the article-position-sensing mechanism 61, the article-position-sensing mechanism 61 returns to its initial position. Thereupon, the NOR-gate 118 transfers its output signal from the resetting of the flip-flop 115 and transmission to the NOR-gate 116 for inhibiting the NOR-gate 120 from producing an output signal. As a result thereof, the NOR-gate 120 does not operate the reject mechanism 35 and the reject mechanism 35 is turned off.

If the weight-sensing device 70 produces an acceptable weight signal in its output, the flip-flop circuit 115 does not change its state. Hence, the flip-flop 117 does not change its state. Therefore, the NOR-gate 120 is inhibited from producing an output signal, and the reject mechanism 35 is not operated. The article-position-sensing mechanism 61 operates in the manner previously described. While the NOR-gate 118 does not inhibit the NOR-gate 120, the flip-flop 117 does inhibit the NOR-gate 120. Thus, the weighed article will advance onto the discharge conveyor 67 for advancement to the succeeding station.

It is to be understood that variations and modifications could be effected without departing from the spirit of the invention and the scope of the appended claims.

Having thus described my invention, what I claim as new and desire to protect by Letters Patent is:

1. Weighing apparatus comprising a platform; means for advancing articles continuously and in succession onto said platform across which said articles continue to move continuously and in succession; an article-position-sensing mechanism activated in response to an article being advanced from said advancing means onto said platform; yieldable means for supporting said platform including cantilever springs and a preload arm arranged to counterbalance the platform; a stop for limiting the upward movement of said platform, and restraining means responsive to the activation of said article-position-sensing mechanism for restraining said platform against deflection while an article is being advanced from said article-advancing means onto said platform including a fluid-activated device for urging said preload arm in a direction to lock said platform against said stop.

2. An article-sorting apparatus as claimed in claim 1 wherein said article-position-sensing mechanism includes a fluid control valve.

3. An article-sorting apparatus as claimed in claim 2 wherein said restraining means for restraining said weighing platform also includes a fluid control circuit operatively controlled by said article-position-sensing mechanism for controlling the operation of said fluid activated device.